(12) United States Patent
Liu et al.

(10) Patent No.: US 10,436,663 B2
(45) Date of Patent: Oct. 8, 2019

(54) SEMICONDUCTOR PRESSURE SENSOR INCLUDING IMPROVED STRUCTURE AND INTEGRATED SENSOR CHIP

(71) Applicant: WUHAN FINEMEMS INC., Wuhan, Hubei (CN)

(72) Inventors: Sheng Liu, Hubei (CN); Xiaoping Wang, Hubei (CN); Dengfeng Wu, Hubei (CN); Fanliang Li, Hubei (CN); Bin Chen, Hubei (CN)

(73) Assignee: WUHAN FINEMEMS INC., Hubei (CN)

( * ) Notice: Subject to any disclaimer, the term of this patent is extended or adjusted under 35 U.S.C. 154(b) by 161 days.

(21) Appl. No.: 15/510,506

(22) PCT Filed: Sep. 28, 2014

(86) PCT No.: PCT/CN2014/000878
§ 371 (c)(1),
(2) Date: Mar. 10, 2017

(87) PCT Pub. No.: WO2016/037302
PCT Pub. Date: Mar. 17, 2016

(65) Prior Publication Data
US 2017/0254713 A1    Sep. 7, 2017

(30) Foreign Application Priority Data
Sep. 11, 2014    (CN) .......................... 2014 1 0461573

(51) Int. Cl.
*G01L 19/00*    (2006.01)
*G01L 19/14*    (2006.01)
(Continued)

(52) U.S. Cl.
CPC .......... *G01L 19/141* (2013.01); *G01L 9/0054* (2013.01); *G01L 9/06* (2013.01);
(Continued)

(58) Field of Classification Search
CPC . G01L 9/02; G01L 9/0054; G01L 9/06; G01L 7/00; G01L 19/141; G01L 19/0038;
(Continued)

(56) References Cited

U.S. PATENT DOCUMENTS 7,644,625 B2 *    1/2010    Ricks .................... G01L 13/025
438/108
2012/0144923 A1 *    6/2012    Yahata .................. G01L 9/0042
73/754

FOREIGN PATENT DOCUMENTS

CN    1616940 A    5/2005
CN    101846569    *    9/2010
(Continued)

*Primary Examiner* — Harshad R Patel
*Assistant Examiner* — Nigel H Plumb
(74) *Attorney, Agent, or Firm* — Muncy, Geissler, Olds & Lowe, P.C.

(57) ABSTRACT

A pressure sensor has a housing, an air lead-in hole, a pressure lead-in hole, an inner cavity, a sensor chip, a lead frame and a cover plate. One end of the air lead-in hole is in communication with the inner cavity of the housing, and the other end of the air lead-in hole is in communication with the air; the pressure lead-in hole is perpendicularly disposed at the center of the upper surface of the housing, two steps are disposed on the upper surface of the inner cavity, and a horizontal surface-mounted device surface is disposed on each of the steps. The center of the sensor chip is aligned with the centers of the pressure lead-in hole, and the lower end of the pressure lead-in holes are in communication with the cavity of the sensor chip.

9 Claims, 11 Drawing Sheets

(51) Int. Cl.
*G01L 9/06* (2006.01)
*G01L 9/00* (2006.01)

(52) U.S. Cl.
CPC ...... *G01L 19/0038* (2013.01); *G01L 19/0084* (2013.01); *G01L 19/145* (2013.01); *G01L 19/147* (2013.01)

(58) Field of Classification Search
CPC .. G01L 19/0084; G01L 19/145; G01L 19/147
See application file for complete search history.

(56) References Cited

FOREIGN PATENT DOCUMENTS

| | | |
|---|---|---|
| CN | 101846569 A | 9/2010 |
| CN | 201852672 U | 6/2011 |
| CN | 102706490 A | 10/2012 |
| CN | 202614454 U | 12/2012 |
| CN | 103105248 A | 5/2013 |

* cited by examiner

Deformation proportion factor 5.0e8

SEMICONDUCTOR PRESSURE SENSOR INCLUDING IMPROVED STRUCTURE AND INTEGRATED SENSOR CHIP

CROSS-REFERENCE TO RELATED APPLICATION

This application claims priority from PCT Application No. PCT/CN2014/000878, filed on Sep. 28, 2014, in WIPO, the content of which is hereby incorporated by reference in their entirety for all purposes.

TECHNICAL FIELD

The invention belongs to the field of pressure sensing technology and refers to pressure sensor and manufacturing method thereof.

BACKGROUND ART

Multiple sensors are known by people in the field of pressure sensing technology. Particularly, pressure sensor based on semiconductor technology is well known by people. Pressure sensor chip is composed of a silicon substrate and an epitaxial layer growing on the silicon substrate, wherein an elastic film is formed on the silicon substrate through MEMS (micro electro mechanical system) technology. If a pressure is applied on the elastic film, the elastic film will be bent at a certain degree according to the intensity of pressure. Sensitive components formed by deposition or ion implantation may be bent due to deformation of the film. The sensitive components have the piezoresistive effect, so, they have resistance variation, and the resistance variation are converted into a voltage and output through a Wheatstone bridge composed of the sensitive components.

In the relevant technical fields, a pressure sensor for measuring target fluid pressure is introduced in the patent (No. US2012/0144923A1). The introduced pressure sensor comprises a housing, a sensor chip, a data processing chip, and a cover plate for sealing. Two separation inlet holes are set on one side of the same plane on the upper part of the housing, one is used for leading the measured fluid into the inner cavity of the housing, and the other one is in communication with the air. Particularly, the pressure of the lead-in measured fluid acts on the front of the sensor chip; however, the lead-in air pressure acts on the back cavity of the sensor chip. In addition, the data processing chip set at one side of the sensor chip is in mutual connection with the sensor in a lead bonding manner. At last, the inner cavity of the housing is sealed through the cover plate.

However, through the structure of the pressure sensor introduced in the above-mentioned patent, the measured fluid enters the inner cavity of the housing through the fluid lead-in hole and directly touches the front of sensor chip, so the circuit set on the surface of sensor will be affected seriously by the disturbance of measured fluid, even reliability and long-term stability of the sensor will be reduced. Further, the air lead-in hole and pressure lead-in hole of the sensor in the above-mentioned patent are set to be convex cylindrical holes separated from each other, and this structure is easy to cause increase of sensor size and reduction of intensity. If there is a large distance between the two holes, it shows that plan view size of the sensor in the XY direction is large; if there is a small distance between the two holes, it shows that long air inlet hole shall be set to increase the size in the Z distance of sensor, as a result, torsional rigidity of the pressure inlet part (i.e. the pressure inlet part 1a in FIG. 2) on the housing is reduced. Further, the data processing circuit is not integrated in the pressure sensor chip, so the sensor will be more complex in structure and higher in cost. Further, it is more likely to cause leakage due to poor sealing when the measured fluid is put into the housing.

Content

For overcoming defects existing in the prior art, the present disclosure provides a pressure sensor and a manufacturing method thereof. The pressure sensor is featured with high reliability, good long-term stability, small integrated chip size and high accuracy. The technical scheme is as follows:

A pressure sensor, comprising a housing, an air lead-in hole, a pressure lead-in hole, an inner cavity, a sensor chip, a lead frame and a cover plate; the housing, the pressure lead-in holes and the inner cavity are integrally formed by means of an injection molding process; one end of the air lead-in hole is in communication with the inner cavity of the housing, and the other end of the air lead-in hole is in communication with the air; the pressure lead-in hole is perpendicularly disposed at the center of the upper surface of the housing, two steps are disposed on the upper surface of the inner cavity, and a horizontal surface-mounted device surface is disposed on the of the steps; the sensor chip is integrated with a data processing circuit and adhered on the horizontal upper surface of the inner cavity of the housing in an inverted manner by means of adhesives; the center of the sensor chip is aligned with the center of the pressure lead-in hole, and lower end of the pressure lead-in holes is in communication with the cavity of the sensor chip; the lead frame is tightly adhered with the housing in the process of injection molding curing of the housing, and a bonding pad of the lead frame is disposed on each of the steps in the inner cavity; the sensor chip and the lead frame are electrically connected in a gold wire bonding manner, and the cover plate is adhered with the bottom of the housing by means of adhesives.

In the pressure sensor, the air lead-in hole is used for leading air pressure into the inner cavity of the housing; the pressure lead-in hole is used for leading the measured fluid, and the pressure of the measured fluid acts on the back cavity of the sensor chip; the sensor chip is used for measuring the pressure of the fluid to the air; particularly, the data processing circuit is integrated on the chip, and the cover plate is used for sealing the inner cavity of the housing.

Preferably, in the pressure sensor, the housing comprises a cavity part, a tubular pressure inlet part extending from the surface of housing to outside, and an air inlet part coaxial with the pressure inlet part. Particularly, a step is set between the top of air inlet part and the top of pressure inlet part. Further particularly, the air lead-in hole is composed of multiple through holes, which are distributed in a circular array form.

Preferably, the housing comprises a cavity part and a tubular pressure inlet part extending from the surface of housing to outside, and the air lead-in hole of the sensor is set at the side of the housing, which is vertical to the air lead-in hole.

Preferably, the housing comprises a cavity part and a tubular pressure inlet part extending from the surface of housing to outside, and the air lead-in hole is integrated on the upper surface of the housing and connected with the inner cavity of the housing.

Preferably, the cover plate and the air lead-in hole are integrally formed by means of the injection molding process; the sensor chip is adhered on the surface-mounted device surface by means of adhesives, and then coated with sealant.

Further particularly, the housing comprises a pressure inlet part, an air inlet part and a cavity part; the air lead-in hole is composed of two parts which are a vertical hole and a horizontal hole; the lower end of the vertical hole is in communication with the inner cavity, the upper end of the vertical hole is ended at the interior of housing; one end of the horizontal hole is in communication with the air, and the other end of the horizontal hole is in communication with the vertical hole.

A manufacturing method for pressure sensor, comprising the following steps:

Step 1: making a lead frame: the lead frame is made of tin bronze material, and both the pin and bonding pad in the lead frame are nickeled for 2 microns and gilded for 0.05 microns;

Step 2: the housing of sensor, the air lead-in hole, the pressure lead-in holes and the inner cavity are formed by means of an injection molding process; the housing and the cover plate are made of PBT+30% GF; while the housing is injected, the lead frame is tightly adhered with the housing through this process, a bonding pad of the lead frame is disposed on each of the steps in the inner cavity, and then a pin of the lead frame is bent;

Step 3: the sensor chip is adhered in the center of surface-mounted device surface in the housing in an inverted manner to make the cavity of the sensor chip be in communication with the pressure lead-in hole, wherein the sensor chip is tightly adhered with the surface-mounted device surface by means of adhesives, and then they are dried at the temperature of 150° C. for 30 min, so as to make the sensor chip compactly and firmly be communication with the surface-mounted device surface;

Step 4: the sensor chip and the lead frame are electrically connected in a gold wire bonding manner;

Step 5: the cover plate is adhered with the bottom of the housing cavity by means of adhesives, and they are dried at the temperature of 150° C. for 30 min.

Beneficial effects of the present disclosure: the difference between the data processing chip and sensor chip used in the prior art at the same time is that the data processing circuit in the pressure sensor of the invention is integrated in the sensor chip, as a result, mutual electrical connection between the chips is reduced, so as to greatly reduce the possibility of making the sensor disabled in the electrical connection aspect. In the other aspect, the measured fluid makes its pressure act on the back cavity of the sensor chip directly through the pressure lead-in hole in the pressure sensor of the invention, so it just needs to ensure effective sealing of the sensor chip and the surface-mounted device surface, so as to reduce the sealing area and leakage risk of the sensor; meanwhile, this structure bearing the pressure on the back is capable of preventing adverse effect for electrical connection of the fluid disturbance for the sensor. In addition, the air lead-in hole is connected with the inner cavity of the housing to make the air pressure act on the front of the sensor chip, so it needs to ensure accuracy of the sensor.

In the first exemplary embodiment, the air lead-in hole of the sensor is composed of multiple through holes, which are distributed in circular array form and coaxial with the air lead-in hole, so that the structure of sensor is simplified and it is beneficial for reducing the size of sensor. A step is set between the upper surface of pressure lead-in hole and the upper surface of the air lead-in hole, to facilitate positioning during assembly with the external pipe, and to prevent the air lead-in hole from being jammed by the pipe. In the second exemplary embodiment, the air lead-in hole is set at the side of the housing, and this structure is capable of effectively reducing the possibility that the external pollutant enters into the cavity, without influence on potting. In the third exemplary embodiment, the air lead-in hole is integrated on the upper surface of the housing, and the structure of structure is further simplified. In the fourth exemplary embodiment, the air lead-in hole is set in the cover plate of the sensor, and this structure is beneficial for using the pouring sealant for performing potting protection for the sensor chip, so as to avoid the pollution by the air. In the fifth exemplary embodiment, the air lead-in hole is composed of two parts, and this structure is capable of effectively preventing the external pollutant from entering into the inner cavity of the housing and preventing the air lead-in hole from being jammed by the pipe during assembly; in addition, the step on the upper part of the air lead-in hole is capable of providing positioning for the pipe assembly.

FIGURE DESCRIPTION

FIG. 4A and FIG. 4B show views of the sensor chip according to the first exemplary embodiment of the present disclosure, wherein FIG. 4A shows a top view and FIG. 4B shows a section view.

Figure 6A:
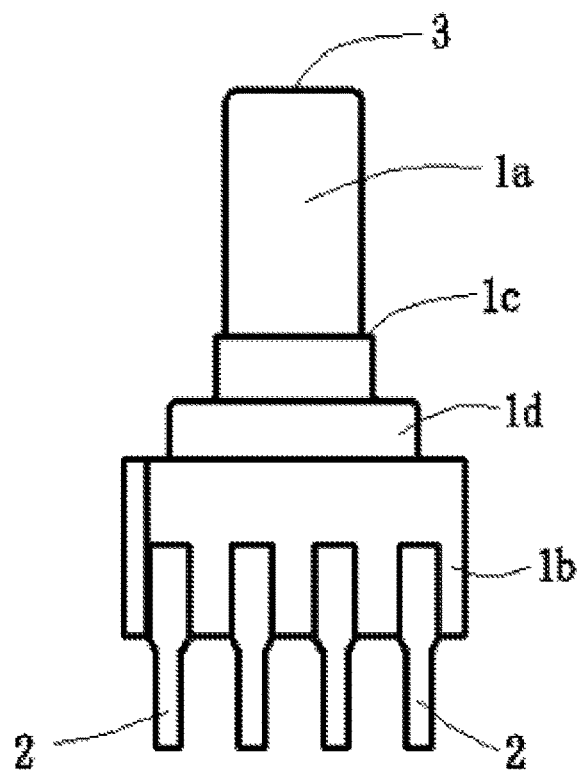
Figure 6B:
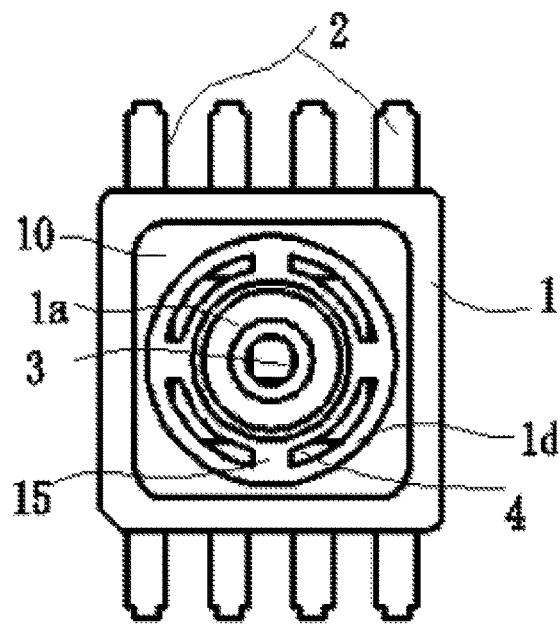
Figure 6C:
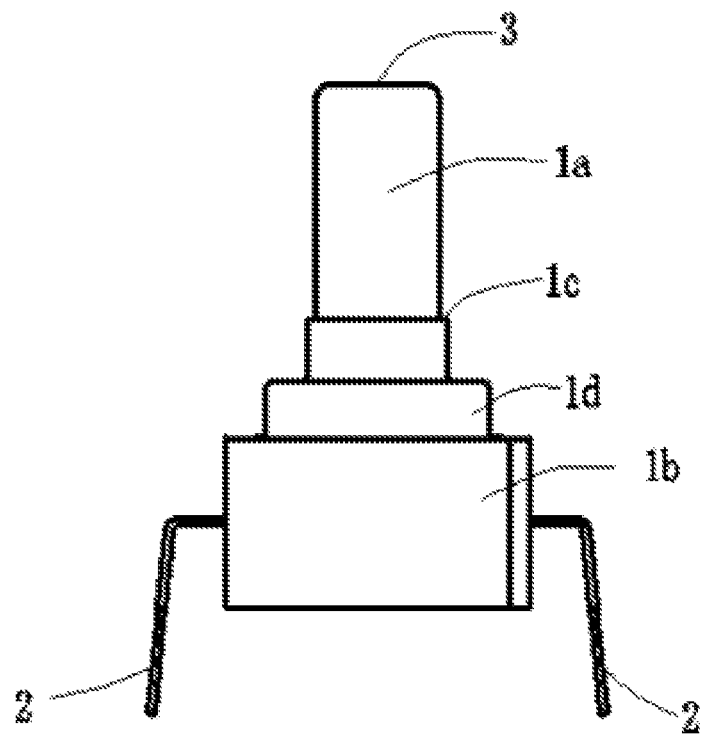
Figure 6D:
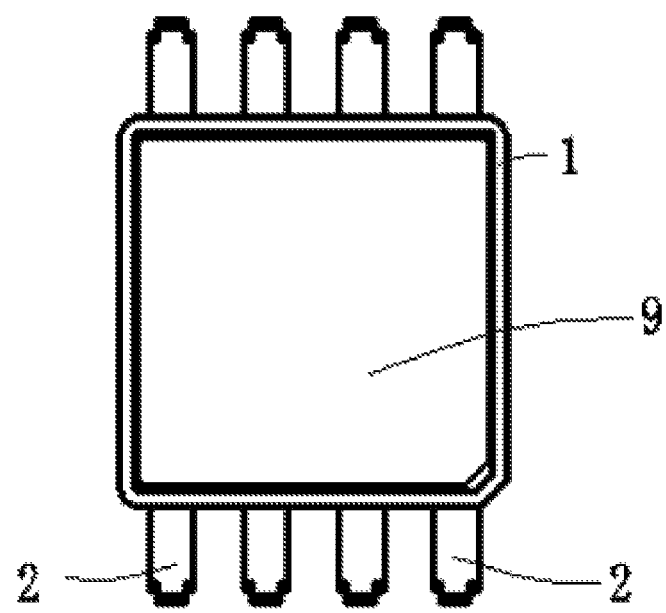

FIG. 6A~D shows views of the pressure sensor manufactured based on the semiconductor technology according to the first exemplary embodiment of the present disclosure, wherein FIG. 6A shows a side view of the sensor of the present disclosure, FIG. 6B shows a top view, FIG. 6C shows a front view, and FIG. 6D shows a bottom view.

Figure 7:
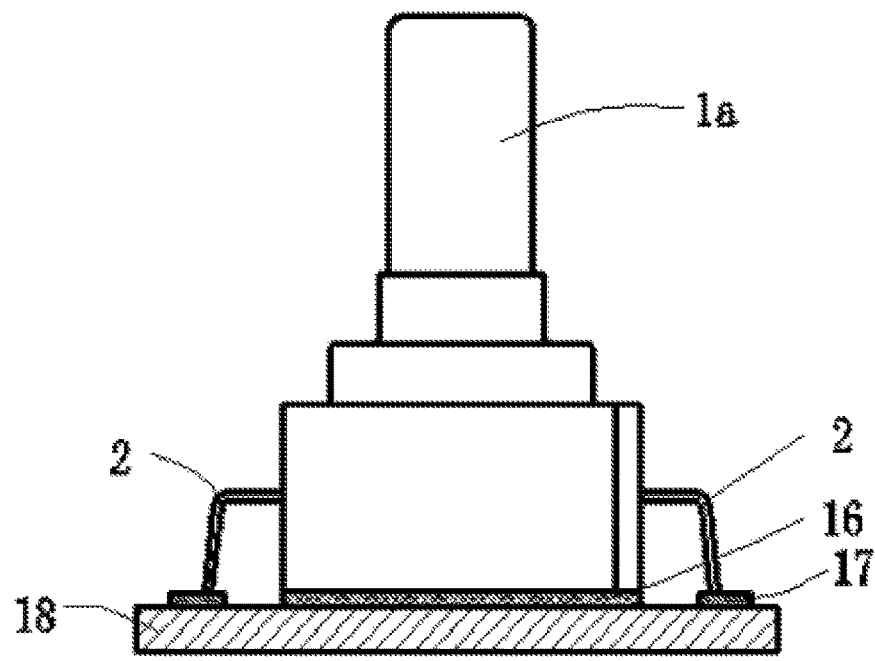

FIG. 7 shows schematic diagram for installation of the pressure sensor on the base plate according to the first exemplary embodiment of the present disclosure.

Figure 8:
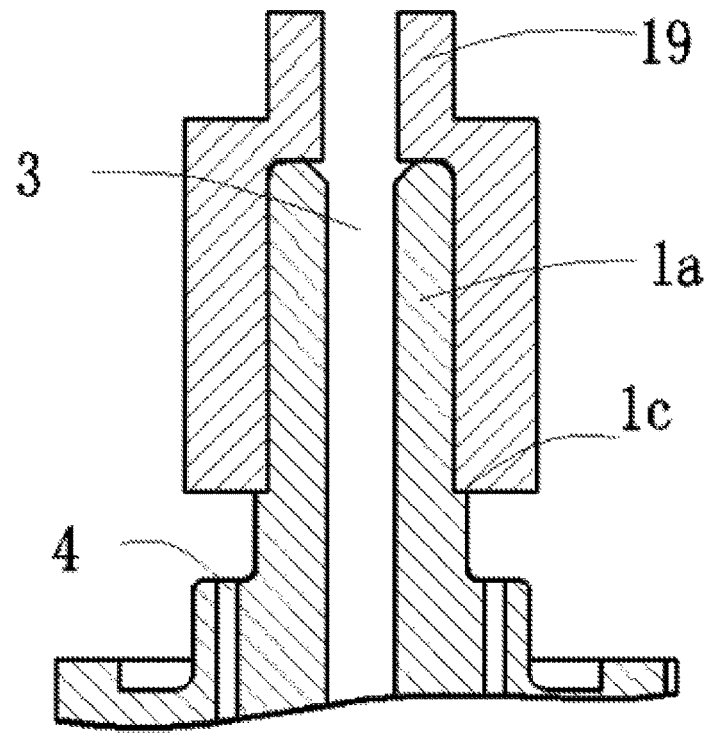

FIG. 8 shows a section view for connection of pressure lead-in hole area of the pressure sensor and the pipe according to the first exemplary embodiment of the present disclosure.

Figure 9:
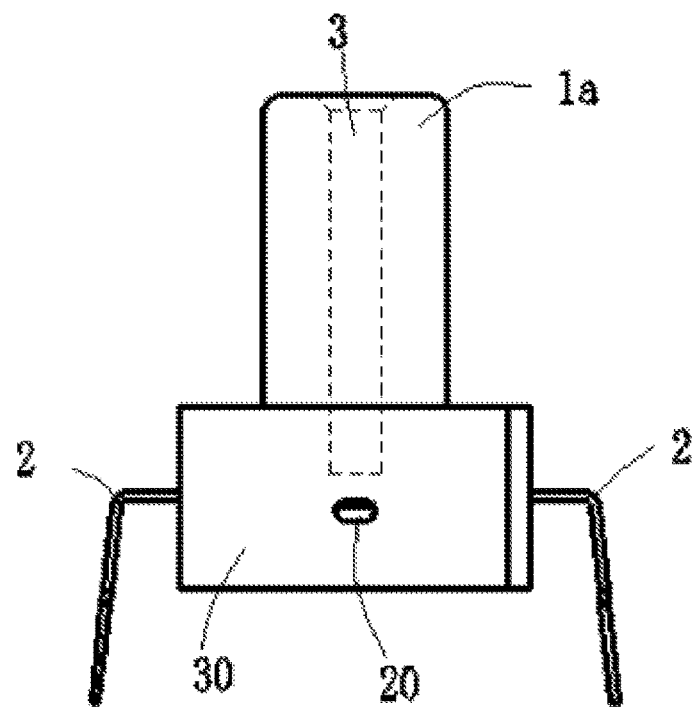

FIG. 9 shows a front view of the pressure sensor according to the second exemplary embodiment of the present disclosure.

Figure 10A:
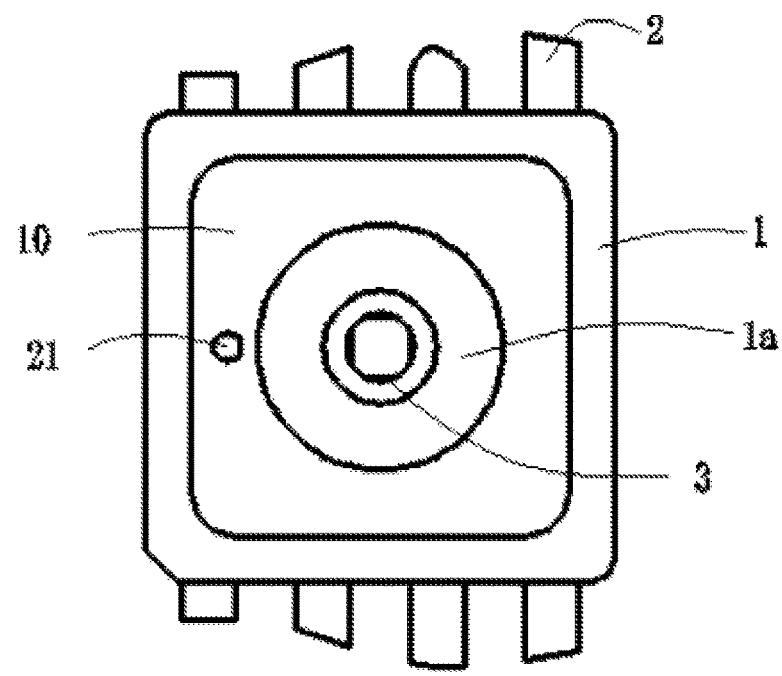
Figure 10B:
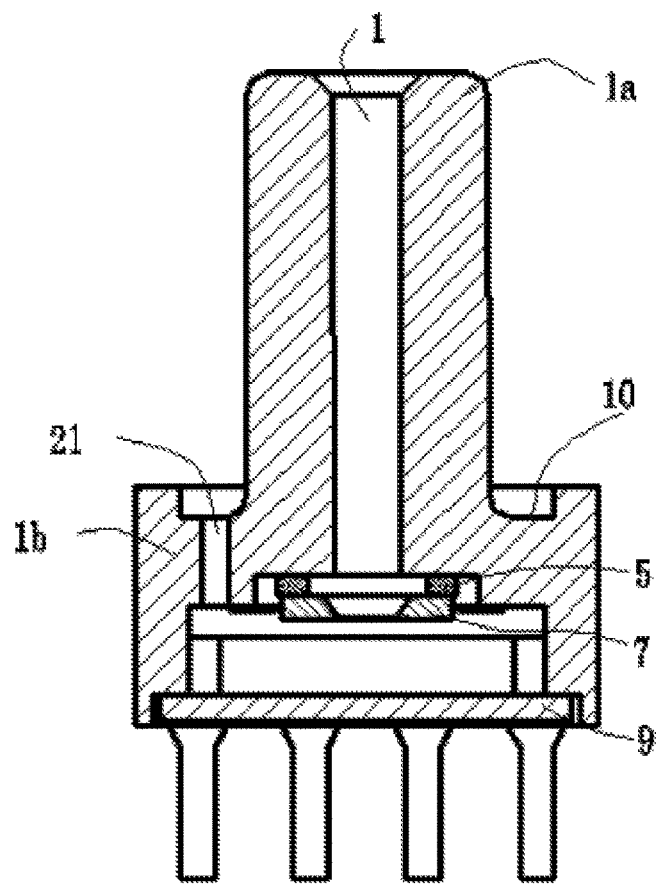

FIG. 10A and FIG. 10B show a top view and a section view of the pressure sensor according to the third exemplary embodiment of the present disclosure, wherein FIG. 10A shows the top view and FIG. 10B shows the section view.

Figure 11A:
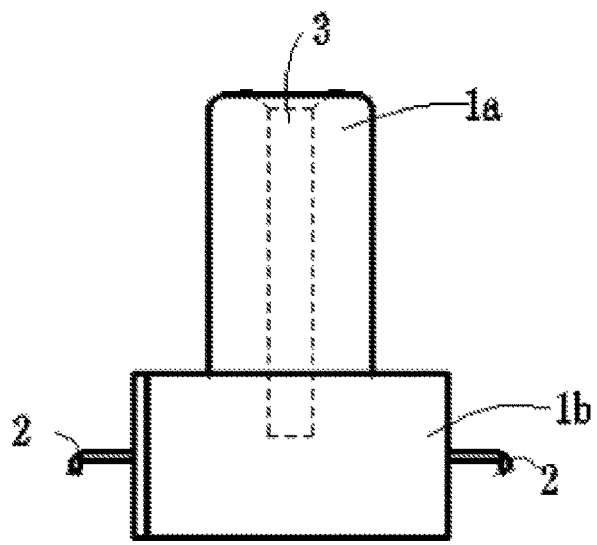
Figure 11B:
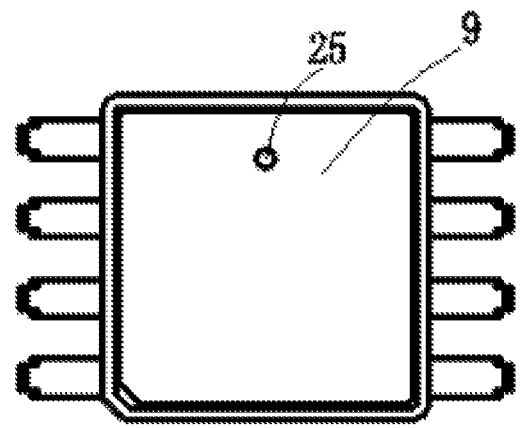

FIG. 11A and FIG. 11B show a front view and a top view of the pressure sensor according to the fourth exemplary embodiment of the present disclosure, wherein FIG. 11A shows the front view and FIG. 11B shows the top view.

Figure 12A:
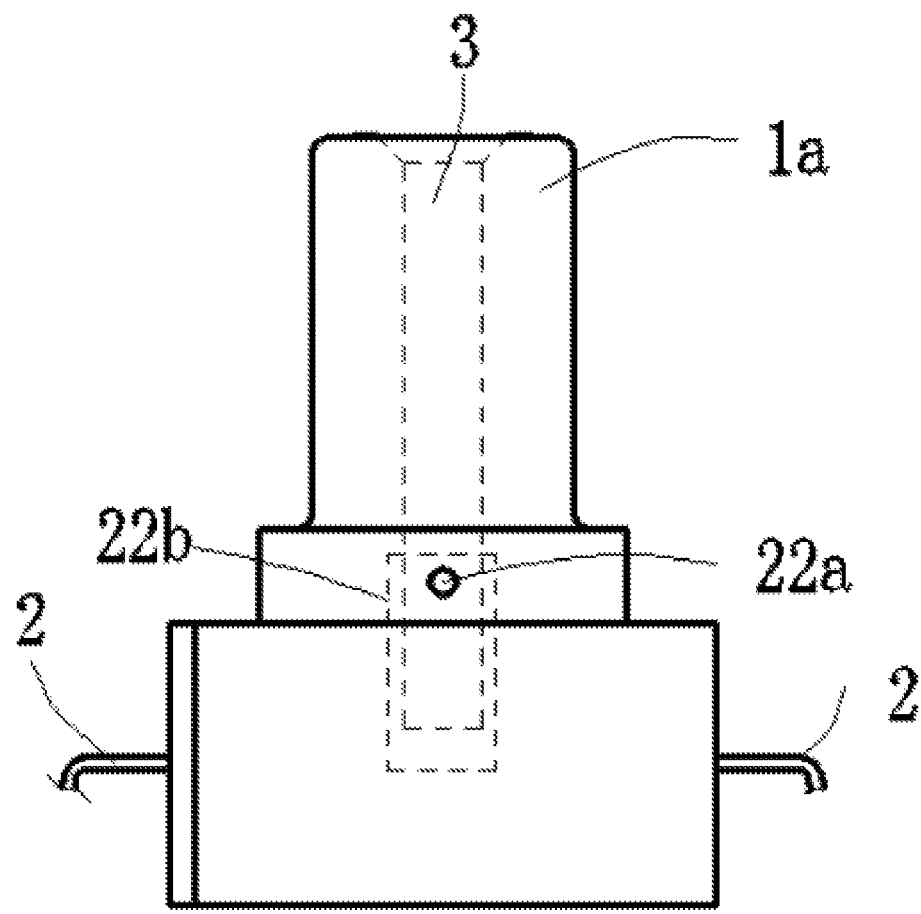
Figure 12B:
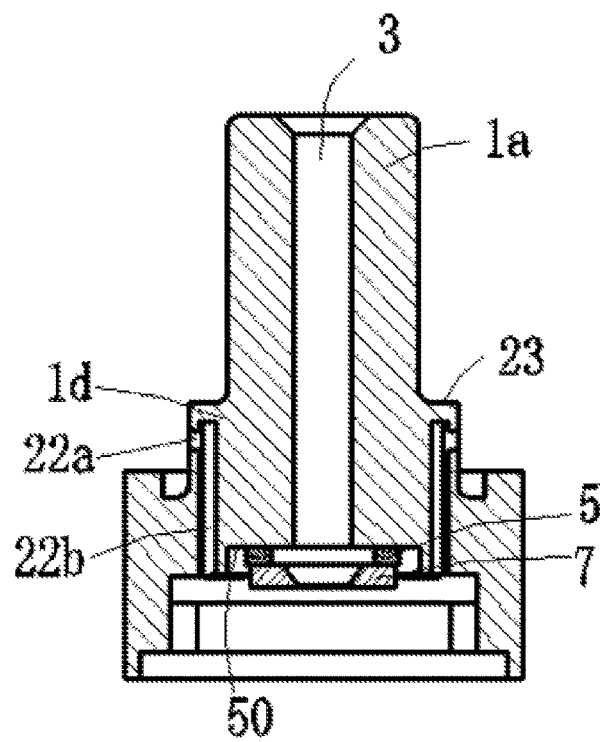

FIG. 12A and FIG. 12B show a front view and a semi-section view of the pressure sensor according to the fifth exemplary embodiment of the present disclosure, wherein FIG. 12A shows the front view and FIG. 12B shows the semi-section view.

Figure 13:
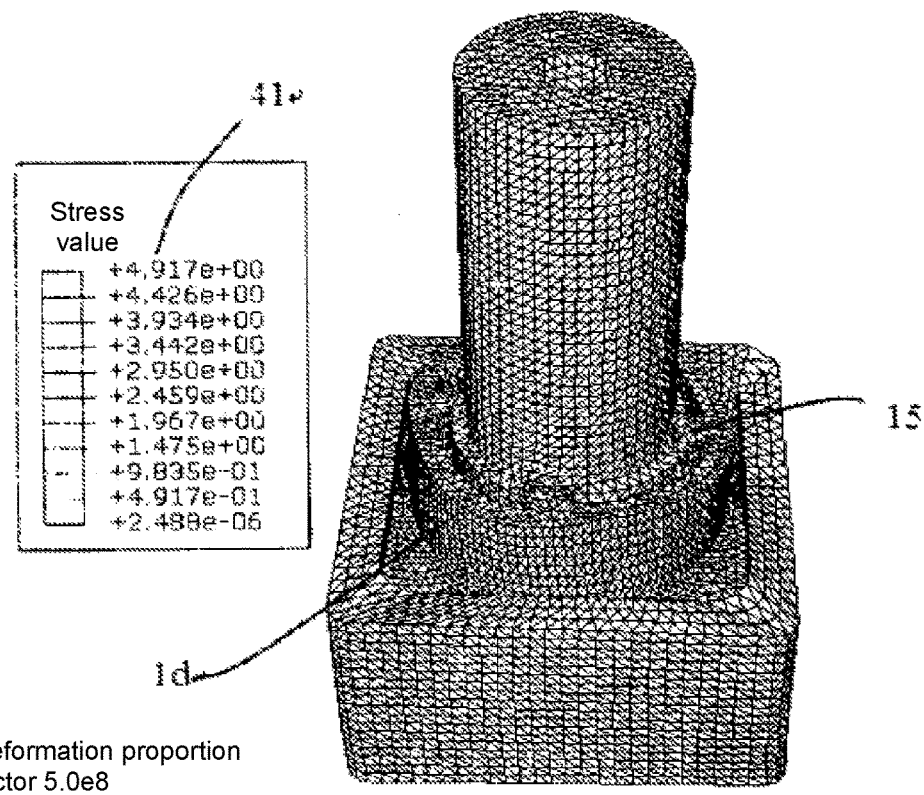

FIG. 13 shows a deformation view of the sensor housing when the pressure sensor without the step suffers a certain torque.

Figure 14:
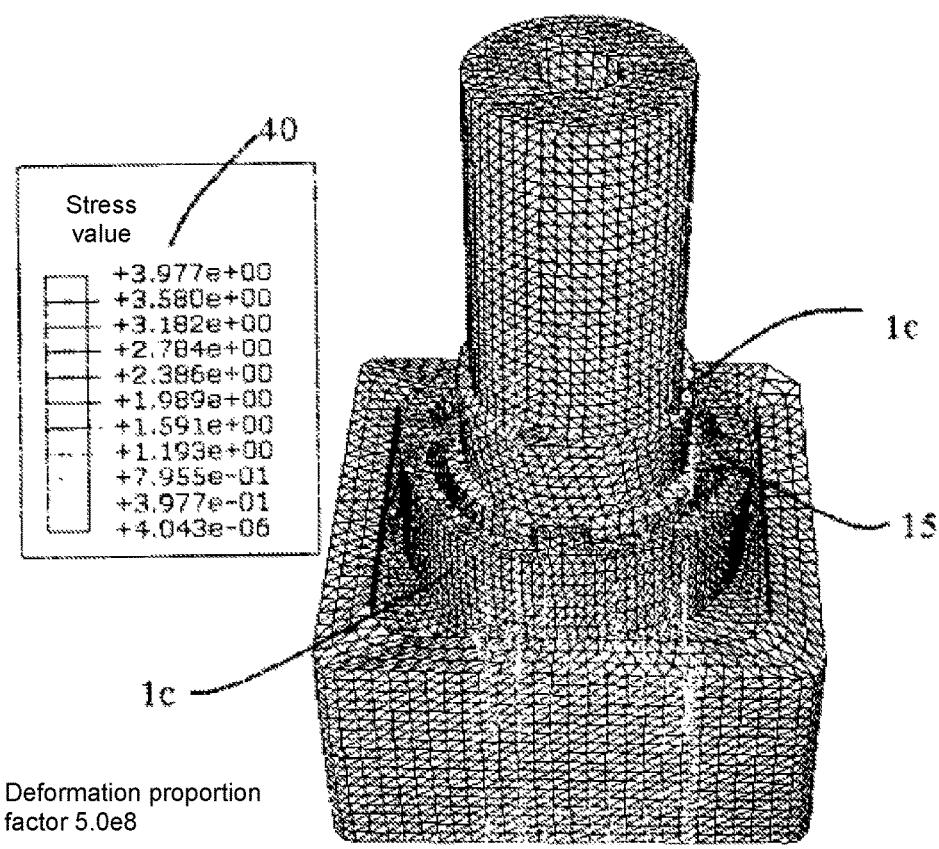

FIG. 14 shows a deformation view of the sensor housing when the pressure sensor with the step suffers a certain torque.

SPECIFIC EXEMPLARY EMBODIMENT

A more detailed description for the technical scheme of the present disclosure is given below by combining with the figures and specific exemplary embodiments.

First Exemplary Embodiment

Figure 1:
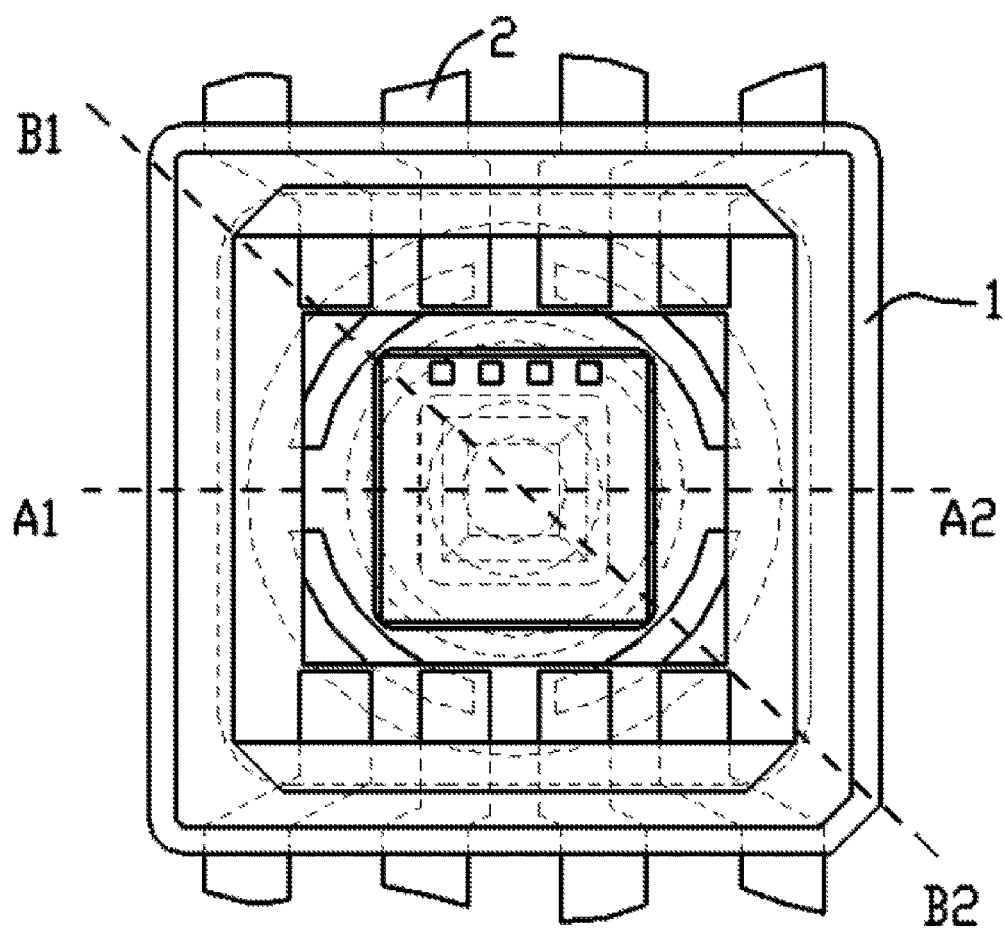
FIG. 1 shows a top view of a semiconductor pressure sensor according to the first exemplary embodiment of the present disclosure.
Figure 2:
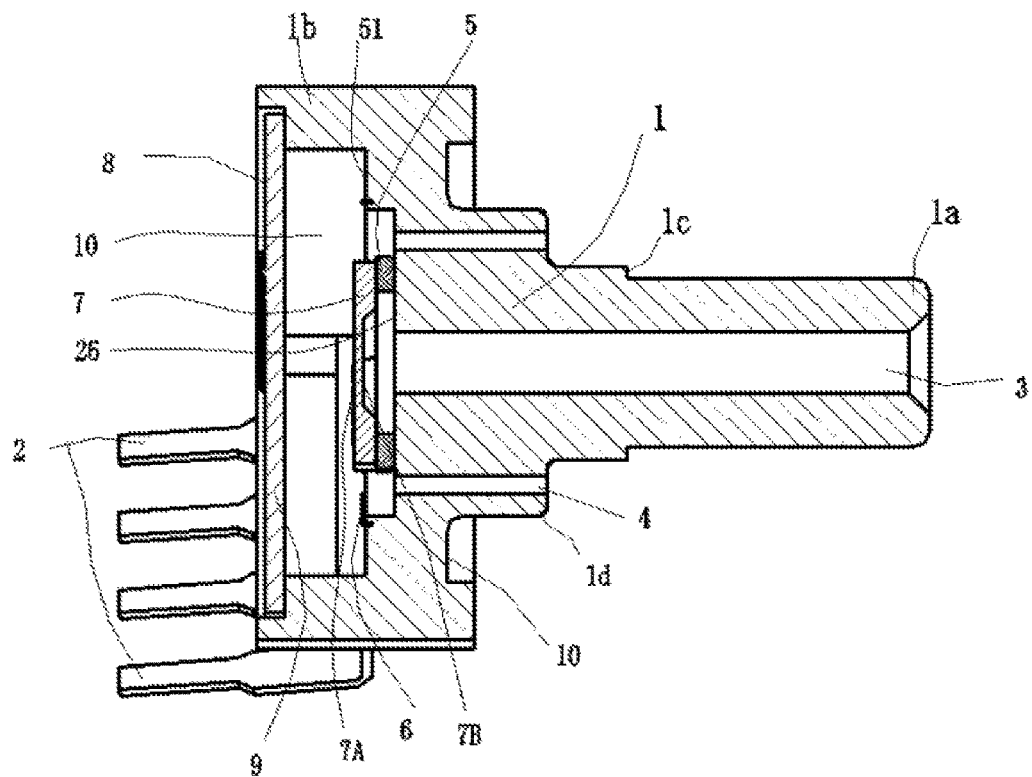
FIG. 2 shows a B1-B2 section view of FIG. 1.
Figure 3:
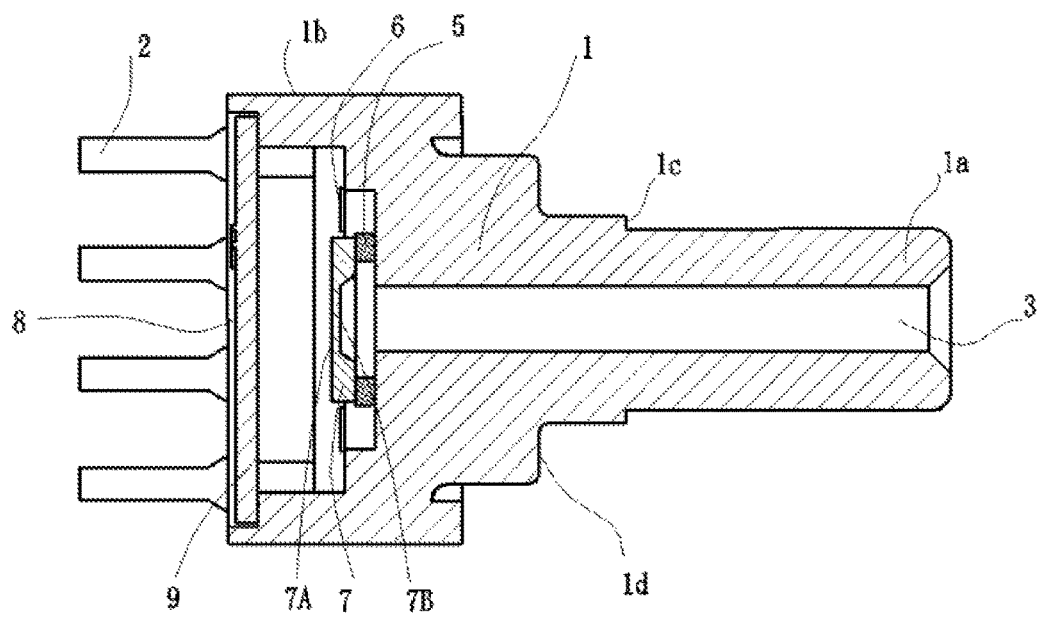
FIG. 3 shows an A1-A2 section view of FIG. 1.
Figure 4A:
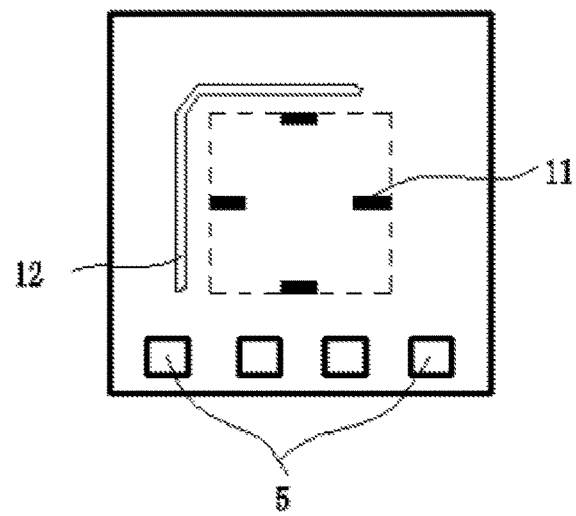
Figure 4B:
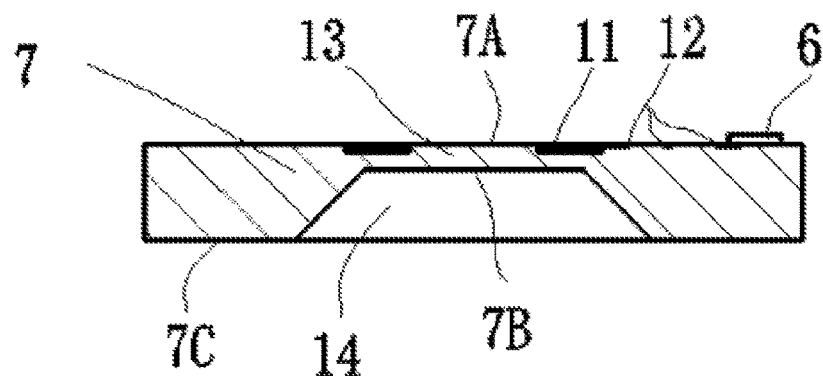

FIG. 1 shows a top view of a semiconductor pressure sensor according to the first exemplary embodiment of the present disclosure, FIG. 2 shows a B1-B2 section view of FIG. 1, and FIG. 3 shows an A1-A2 section view of FIG. 1. FIG. 4A and FIG. 4B show views of the sensor chip according to the first exemplary embodiment of the present disclosure, wherein FIG. 4A shows a top view and FIG. 4B shows a section view. In FIG. 4B, the surface 7A of the sensor chip is the obverse side, and the surface 7C is the reverser side.

The pressure sensor according to the first exemplary embodiment of the present disclosure is characterized into that the pressure lead-in hole 3 and the air lead-in hole 4 are coaxial, and the top of pressure lead-in hole 3 has a certain distance from the top of the air lead-in hole 4. In addition, as shown in FIG. 6B, the air lead-in hole 4 is composed of multiple through holes, which are distributed in a circular array form and numbered as N, N≥2. Meanwhile, the strength of the housing 1 is mainly related to the number of through holes and size; preferably, the air lead-in hole 3 is composed of two or four through holes in the circular array form.

As shown in FIG. 1, a step 1c is set between the top end of pressure lead-in hole 3 and the top end of the air lead-in hole 4, and the step 1c is used for positioning connection between the pressure lead-in hole area 1a and the pipe 19. Meanwhile, the setting of the step 1c is beneficial for enhancing the connection strength between the cavity part 1b of the housing 1 and the pressure lead-in hole area 1a.

FIG. 13 shows a deformation view as the housing 1 without the step 1c suffers a certain torque through simulating a calculation of finite elements; in FIG. 13, the data calculation area 41 represents the maximum stress on the housing 1 without the step 1c. FIG. 14 shows a deformation view as the housing 1 with the step 1c suffers the same torque through simulating the calculation of the finite elements; in FIG. 14, the data calculation area 40 represents the maximum stress on the housing 1 with the step 1c. Through stress contrastive analysis for two models, under the same condition, the stress on the housing 1 with step 1c is less than that of housing 1 without the step 1c. There is low stress on the housing 1 with step 1c in the connection area 15, and there is small deformation of air inlet part 1d due to stress. Thus, the structure of housing 1 with the step 1c is more reliable.

The air lead-in hole 4 is in communication with the inner cavity 10 of the housing 1. Meanwhile, the observe side (i.e. the surface 7A) of the sensor chip 7 is in communication with the air, and the pressure lead-in hole 3 is in communication with the bottom 7B of the back cavity in the sensor chip 7. Thus, the sensor of the present disclosure is used for measuring the pressure value of the fluid with respect to the air pressure.

The housing 1 comprises a cavity part 1b, a tubular pressure inlet part 1a extending from the surface 10 of the housing 1 to outside, and an air inlet part 1d coaxial with the pressure inlet part 1a. Particularly, the air inlet part 1d and the pressure inlet 1a extend at the same direction, and the extending length of the air inlet part 1d is less than that of the pressure inlet part 1a.

The lead frame 2 is tightly and reliably connected with the housing 1 by means of an injection molding process, and the cover plate 9 is manufactured by the same injection molding process.

As shown in FIG. 4A and FIG. 4B, the data processing circuit 12 is integrated at one side of the surface 7A of the sensor chip 7. The data processing circuit 12 and the strain resistor 11 are manufactured by means of diffusion or ion injection process. A cavity 14 is set at the other side of the sensor chip 7A by means of etching and other processes, so as to form a film in the center of the sensor chip 7. In addition, a bonding pad 6 for mutual electrical connection is manufactured on the surface 7A of the sensor chip 7 by means of deposition and other processes.

Figure 5:
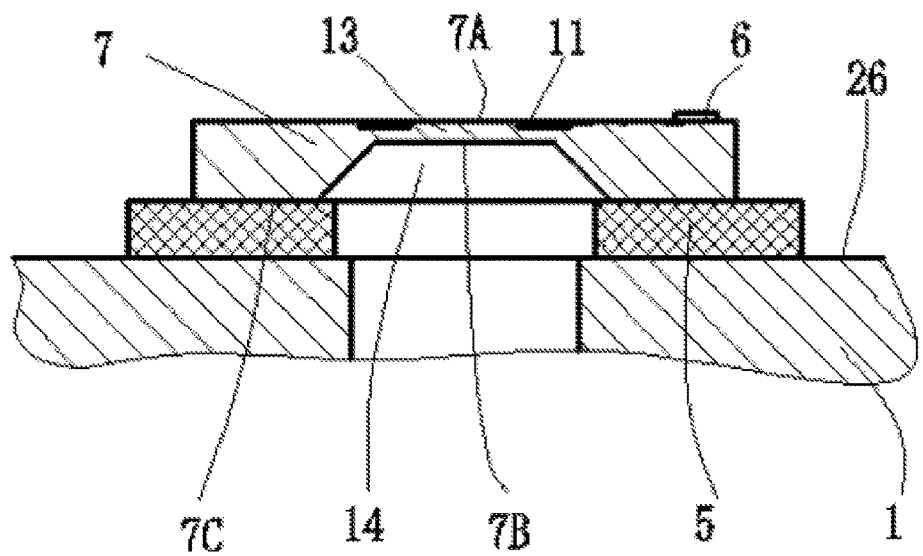
FIG. 5 shows a manner of installing the sensor chip on the base plate according to the first exemplary embodiment of the present disclosure.

When the sensor chip 7 suffers the pressure of the measured fluid with respect to the air pressure, the strain resistor 11 will show its piezoresistive characteristic. As shown in FIG. 5, the sensor chip 7 is tightly adhered on the surface-mounted device surface 26 of the inner cavity 10 in the housing 1 by means of adhesives, and the center of sensor chip 7 is aligned with that of the pressure lead-in hole 3. Furthermore, the bottom of the housing 1 is sealed with the cover plate 9.

FIG. 6A shows a front view of the sensor according to the first exemplary embodiment of the present disclosure, FIG. 6B shows a top view, FIG. 6C shows a side view, and FIG. 6D shows a bottom view. As shown in FIG. 7, the sensor of the present disclosure is installed on a printed circuit board 18, and various pins in the lead frame 2 of the sensor are connected with the bonding pad 17 on the printed circuit board 18 to form mutual electrical connection state. Then, the sensor is fixed to the installed base plate by potting resin 16. The measured fluid is put into the cavity 14 of the sensor chip 7 by connecting the pipe 19 with the cylindrical pressure inlet part 1a. Particularly, installation depth of the pipe 19 is positioned through the step 1c to avoid the air lead-in hole 4 of the sensor from being jammed due to too large matching depth of the bottom end of the pipe 19 with the pressure inlet part 1a.

If the pressure lead-in hole 3 and the air lead-in hole 4 in the exemplary embodiment of the present disclosure are coaxial, this structure will be beneficial for simplifying the structure of the sensor and reducing the size of the sensor.

Particularly, the setting of the step 1c is capable of avoiding the risk that the air lead-in hole 4 in the sensor is jammed by the pipe 19, and enhancing the strength of the housing 1.

Particularly, the back cavity 14 of the sensor chip 7 is connected with the pressure lead-in hole 3, so this structure is capable of protecting the sensor chip and the lead from being affected by the fluid disturbance.

Further particularly, the inner cavity 10 of the housing 1 is in communication with the air lead-in inlet 4, and it is unnecessary to seal the cover plate 9 with the bottom of the housing 1 strictly, or it is unnecessary to check whether there is leakage risk between the both.

Second Exemplary Embodiment

Next, the pressure sensor in the second exemplary embodiment of the present disclosure will be described.

FIG. 9 shows a view of the sensor according to the second exemplary embodiment of the present disclosure. The difference from the first exemplary embodiment of the present disclosure is that the air lead-in hole 4 and the pressure lead-in hole 3 of the sensor in the first exemplary embodiment are coaxial; but in the second exemplary embodiment, the pressure lead-in hole 20 of the sensor is set at the side 30 of the sensor housing 1. The air lead-in hole 20 and the pressure lead-in hole 3 of the sensor in the exemplary embodiment are vertical to each other, and the air lead-in hole 20 is still in communication with the inner cavity 10 of the housing 1. A certain distance is kept between the air lead-in hole 20 and the bottom of the housing 1 to avoid the accuracy of the sensor from being affected as the air lead-in hole 20 is jammed by potting, so it needs to carry out the potting process carefully.

The size of the sensor is further reduced by setting the air lead-in hole 20 on the side 20 of the housing 1, and air pollutants will be reduced to enter into the housing 1 by designing the side of the air lead-in hole 20.

Third Exemplary Embodiment

Next, the pressure sensor in the third exemplary embodiment of the present disclosure will be described.

FIG. 10A shows a top view of pressure sensor in the third exemplary embodiment, and the difference between the first and third exemplary embodiments is that the setting positions of the air lead-in holes 4 and 21 are different. In the exemplary embodiment, the air lead-in hole 21 of the sensor is integrated in the housing 1, the air lead-in hole 21 on the upper plane of the housing 1 extends downwards from the plane 100 to the inner cavity 10 of the housing 1 by means of removing the materials to form the air lead-in hole 21 for making the inner cavity 10 be in communication with the air. FIG. 10B shows a section view of sensor in the third exemplary embodiment of the present disclosure, and the bottom of the air lead-in hole 21 is located in the plane 100.

Thus, during proper potting for the sensor, it is unnecessary to be worry whether the air lead-in hole 21 is jammed by potting resin 16; in addition, the structure of the sensor is beneficial for miniaturizing the sensor.

Fourth Exemplary Embodiment

Next, the pressure sensor in the fourth exemplary embodiment of the present disclosure will be described.

FIG. 11A shows a front view in the fourth exemplary embodiment of the present disclosure, and FIG. 11B shows a bottom view. The difference from the first exemplary embodiment is that the air lead-in hole 25 of the sensor is set in the cover plate 9. As the air lead-in hole 25 is set in the cover plate 9, the chip surface is covered with sol-gel or epoxy resin to avoid the sensor chip 7 from being affected by the external pollutants after the sensor chip 7 is adhered on the base plate. In consideration of the factor that the air lead-in hole 25 in the cover plate 9 is jammed, the air lead-in hole 25 shall be protected during the potting process after the sensor is installed on the printed circuit board 18.

Fifth Exemplary Embodiment

Next, the pressure sensor in the fifth exemplary embodiment of the present disclosure will be described.

FIG. 12A and FIG. 12B show a front view and a section view of the pressure sensor in the fifth exemplary embodiment of the present disclosure respectively. As shown in the above two figures, the air lead-in hole 4 is composed of two parts. One part is a vertical hole 22b, which is located in the housing 1. Particularly, the upper end of the vertical hole 22b is ended in the housing 1, and the other end is connected with the inner cavity 10 of the housing 1; the other part is a horizontal hole 22a vertical to the vertical hole 22b. Particularly, one end of the horizontal hole 22a is in communication with the air, and the other end is in communication with the vertical hole 22b, and the surrounding air enters into the inner cavity 10 of the housing 1 from the air lead-in hole composed of 22a and 22b. As shown in FIG. 12B, the bottom end of the vertical hole 22B is set on the base plate 50 away from the adhered sensor chip 7.

Based on the pressure sensor structure in the exemplary embodiment, the inlet of the air lead-in hole 4 is set at the side of the housing area 1d and the top end of the vertical hole 22b is jammed by the housing area 1d, so, the pollutants in the air can be effectively reduced to enter into the cavity 10. Particularly, the vertical hole 22b is set in the area away from the base plate 50, so, the surface of the sensor is coated with protecting adhesive after the sensor chip 7 is adhered. In this way, it not only can avoid the horizontal hole 22b from being jammed by protecting adhesive, but also can avoid the sensor chip 7 from suffering external pollutant. Further particularly, one end of the air lead-in hole 4 in communication with the air is located at the side of the housing area 1d, so the risk that the air lead-in hole 4 is jammed by the bottom end of the water pipe 19 is removed during installation of water pipe 19. In addition, the upper surface 23 of the housing area 1d can be taken as a positioning step for use. Meanwhile, this structure is capable of avoiding the risk that the air lead-in hole 4 is jammed in the potting stage of the sensor.

At present, Panasonic® has applied some kind of pressure sensors in the washing machine in batch. The liquid level of the liquid in the washing machine is detected by measuring the pressure. However, this kind of sensor is made of independent pressure chip and data processing chip to increase mutual electrical connection between the chips, and reliability of the sensor will be reduced due to failure of mutual connection. On the other hand, for this kind of sensor, there is obverse pressure on the pressure chip of the sensor, as a result, the circuit in front of the sensor is easy to be polluted by the fluid. In addition, the air lead-in hole of the sensor is set on the bottom of the sensor, and the air lead-in hole is easy to be jammed in the potting process, so as to affect the measuring accuracy of the sensor.

The difference from the prior art is that based on the structure of the pressure sensor of the present disclosure, integrated sensor chip is adopted in the pressure sensor of the present disclosure to reduce mutual electrical connection in the sensor, so as to greatly reduce the risk that the reliability of the sensor is reduced due to failure of mutual connection. For the sensor chip in the present disclosure, the back of cavity suffers the pressure, the measured fluid is isolated from the front circuit of the sensor, so as to avoid the pollution of the measured fluid for the sensor chip, and the sensor has better long-term reliability. In the optional exemplary embodiment of the present disclosure, the air lead-in hole and the pressure lead-in hole are coaxial, which is not only beneficial for reducing the size of the sensor, but also avoids the risk that the air lead-in hole is jammed, so as to guarantee the measuring accuracy of the sensor.

The above are specific exemplary embodiments, but the scope of the present disclosure is not limited thereto, the simple change or equivalent modification easily thought by any technical personnel familiar with the technical field shall be included in the scope of the present disclosure.

The invention claimed is:

1. A pressure sensor, comprising a housing, an air lead-in hole, a pressure lead-in hole, an inner cavity, a sensor chip, a lead frame and a cover plate; wherein the housing, the pressure lead-in hole, and the inner cavity are integrally formed by means of an injection molding process; one end of the air lead-in hole is in communication with the inner cavity of the housing, and the other end of the air lead-in hole is in communication with the air; the pressure lead-in hole is perpendicularly disposed at the center of the upper surface of the housing, a plurality of inner steps are disposed on the upper surface of the inner cavity, and a horizontal surface-mounted device surface is disposed on each of the inner steps; wherein the sensor chip is integrated with a data processing circuit and adhered on the horizontal upper surface of the inner cavity of the housing in an inverted manner by means of adhesives; the center of the sensor chip is aligned with the center of the pressure lead-in hole, and the lower end of the pressure lead-in hole is in communication with the cavity of the sensor chip; wherein the lead frame is tightly adhered with the housing in the process of injection molding curing of the housing, and a bonding pad of the lead frame is disposed on each of the inner steps in the inner cavity; wherein the cover plate is adhered with the bottom of the housing by means of adhesives; wherein the housing further includes: a cavity part defining the inner cavity; a pressure inlet part extending from the cavity part to define the pressure lead-in hole, with a cross-sectional area of the pressure inlet part being smaller than the cavity part; and an outer step disposed on the outer surface of the pressure inlet part and extending from the cavity part, wherein the outer step is set between the top end of the pressure lead-in hole and the top end of the air lead-in hole.

2. The pressure sensor according to claim 1, wherein the housing, the air lead-in hole, the pressure lead-in hole, and the inner cavity are integrally formed by means of the injection molding process.

3. The pressure sensor according to claim 2, further in including an air inlet part defining the air lead-in hole, the air inlet part being coaxial with the pressure inlet part.

4. The pressure sensor according to claim 3, wherein the outer step is set between the top of air inlet part and the top of pressure inlet part.

5. The pressure sensor according to claim 2, wherein the air lead-in hole is composed of multiple through holes, which are distributed in a circular array form and numbered as N, N≥2.

6. The pressure sensor according to claim 1, wherein the air lead-in hole of the sensor is set at the side of the housing, which is vertical to the air lead-in hole.

7. The pressure sensor according to claim 1, wherein the air lead-in hole is integrated on the upper surface of the housing and connected with the inner cavity of the housing.

8. The pressure sensor according to claim 1, wherein the cover plate and the air lead-in hole are integrally formed by means of the injection molding process; the sensor chip is adhered on the surface-mounted device surface by means of adhesives, and then coated with sealant.

9. The pressure sensor according to claim 1, wherein the housing further comprises an air inlet part defining the air lead-in hole; the air lead-in hole is composed of two parts which are a vertical hole and a horizontal hole; the lower end of the vertical hole is in communication with the inner cavity, the upper end of the vertical hole is ended at the interior of housing; one end of the horizontal hole is in communication with the air, and the other end of the horizontal hole is in communication with the vertical hole.

* * * * *